United States Patent [19]
Bauer

[11] 3,732,996
[45] May 15, 1973

[54] APPARATUS AND METHOD FOR MOUNTING AN ATTACHMENT ON A VEHICLE

[75] Inventor: James J. Bauer, Lisson, N. Dak.

[73] Assignee: Clark Equipment Company, Buchanan, Mich.

[22] Filed: Aug. 30, 1971

[21] Appl. No.: 176,268

Related U.S. Application Data

[63] Continuation of Ser. No. 5,541, Jan. 26, 1970, abandoned.

[52] U.S. Cl. ............214/152, 214/131 A, 214/138 R, 214/140
[51] Int. Cl. ................................................B65g 69/00
[58] Field of Search ..............214/138 R, 620, 131 A, 214/138 C, 77, 131 R, 78, 152, 453, 454, 140

[56] References Cited

UNITED STATES PATENTS

| 3,200,975 | 8/1965 | Chase | 214/77 R X |
| 3,135,404 | 6/1964 | Pilch | 214/142 |
| 3,485,392 | 12/1969 | Lofgren | 214/77 R |
| 3,220,487 | 11/1965 | Pilch | 214/131 X |

*Primary Examiner*—Gerald M. Forlenza
*Assistant Examiner*—Jerold M. Forsberg
*Attorney*—Kenneth C. Witt

[57] ABSTRACT

A vehicle having a body to which a pair of elevatable boom arms are connected. Connected to the boom arms is an attachment carrier. The carrier can engage an attachment so that the attachment can be carried by the boom arms and positioned to bring apparatus on the attachment into cooperation with apparatus on the body of the vehicle for mounting the attachment on the body of the vehicle.

4 Claims, 9 Drawing Figures

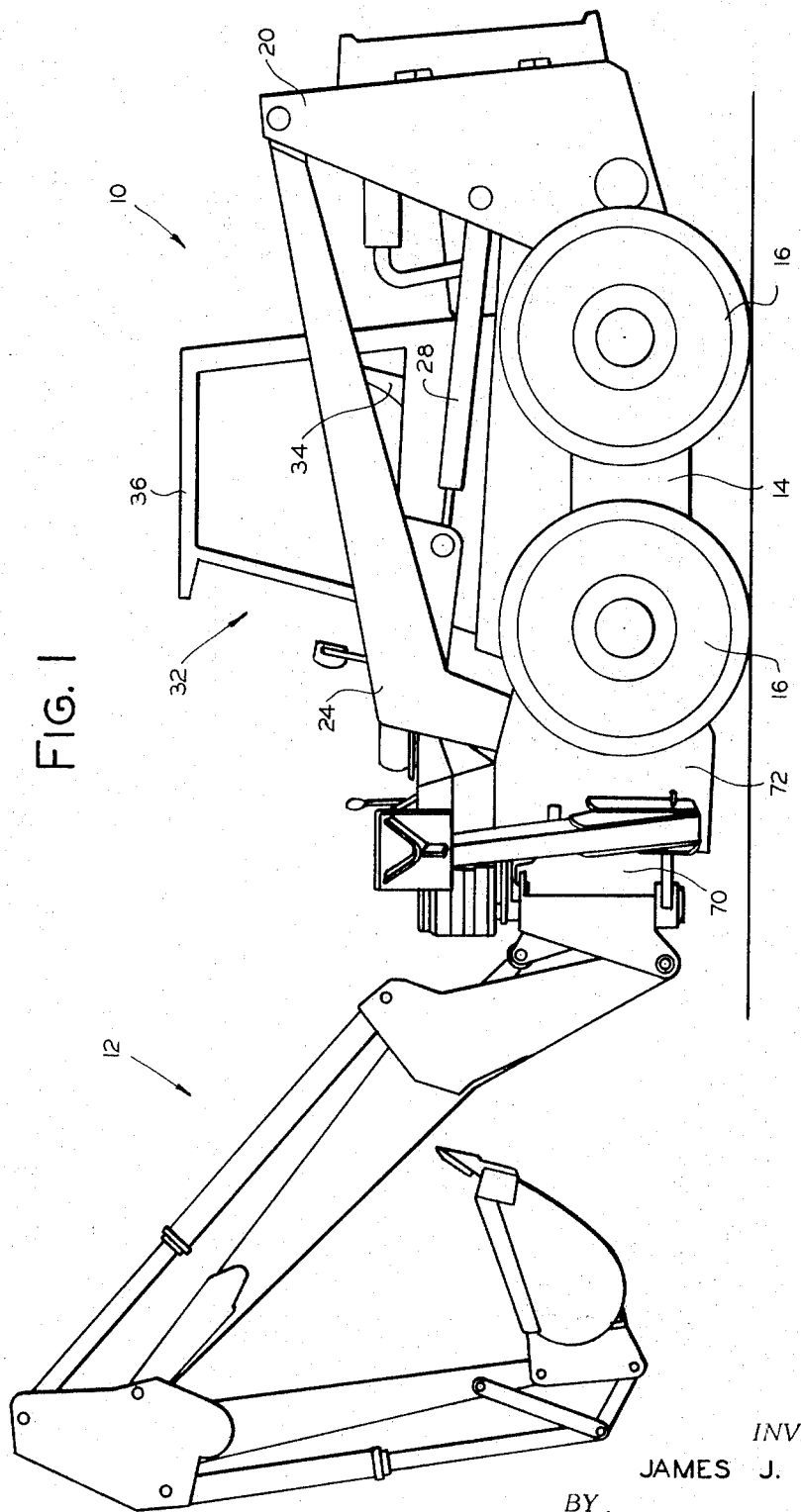

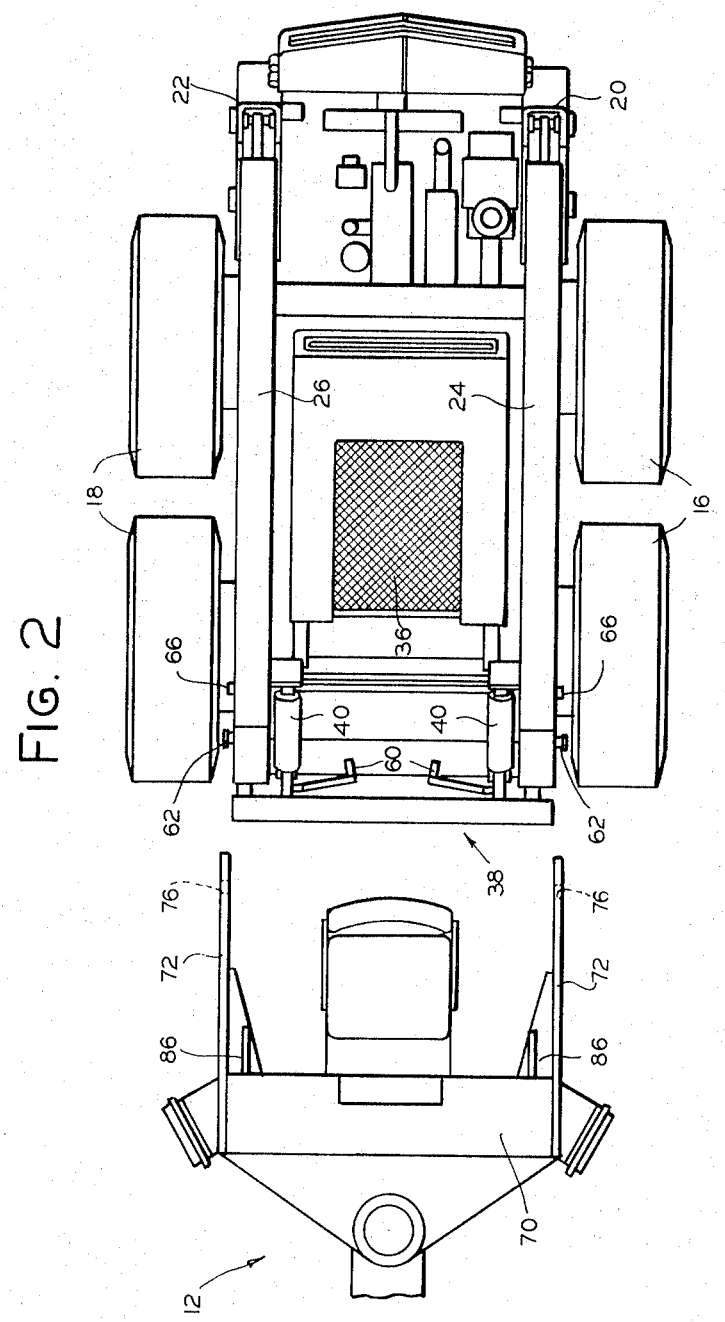
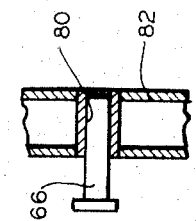

INVENTOR
JAMES J. BAUER
BY
Kenneth C. Witt
ATTORNEY

INVENTOR
JAMES J. BAUER
BY
Kenneth C. Witt
ATTORNEY

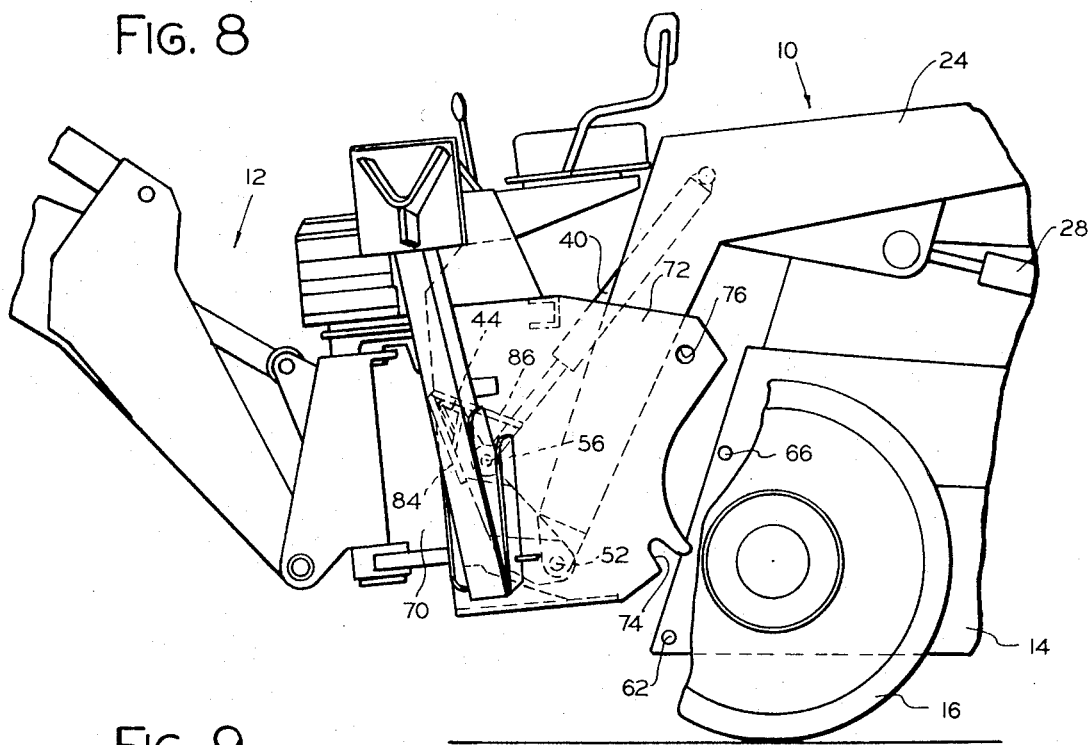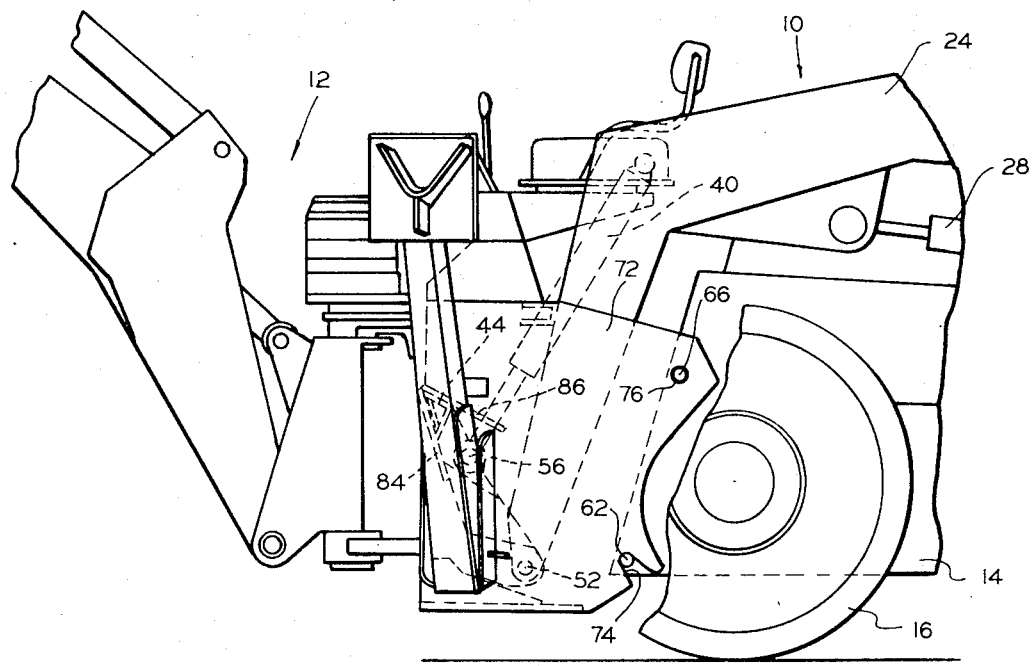

APPARATUS AND METHOD FOR MOUNTING AN ATTACHMENT ON A VEHICLE

This is a continuation of application Ser. No. 005,541, filed Jan. 26, 1970 now abandoned.

BACKGROUND OF THE INVENTION

The field of art to which this invention relates includes material handling vehicles, and more specifically front end loaders.

Backhoes and other attachments which are so heavy as to be difficult or impossible for a person to handle unaided increase the versatility of a vehicle, but present problems in handling when being mounted on or removed from a vehicle.

Therefore, it is a principal object of my invention to provide apparatus and a method for easily mounting on and removing from a vehicle heavy attachments.

SUMMARY OF THE INVENTION

In carrying out my invention in a preferred embodiment, I provide a vehicle having a body to which a pair of elevatable boom arms are connected. Pivotally connected to the boom arms is an attachment carrier which is engagable with an attachment so that the attachment can be carried by the boom arms. Connecting means on the vehicle body cooperate with connecting means on the attachment and are disposed so that the connecting means on the attachment can be brought into cooperation with the connecting means on the body while the attachment is carried by the boom arms.

In carrying out my invention I have conceived a method for mounting an attachment on my novel vehicle which includes engaging the attachment with the carrier, and then actuating the boom arms and carrier to bring the connecting means on the attachment into cooperation with the connecting means on the vehicle body.

The above and other objects, features and advantages of my invention will be more readily understood by persons skilled in the art when the drawings are taken in conjunction with the detailed description.

BRIEF DESCRIPTION OF THE DRAWING

FIG. 1 shows a backhoe attachment mounted on my novel vehicle,

FIG. 2 is a plan view of my vehicle with the backhoe detached,

FIG. 5 is a cross-section taken along line 5-5 of FIG. 6, and

FIGS. 6 through 9 are fragmentary views showing various stages in the mounting of the backhoe on the vehicle.

DESCRIPTION OF THE PREFERRED EMBODIMENT

Figure 3:
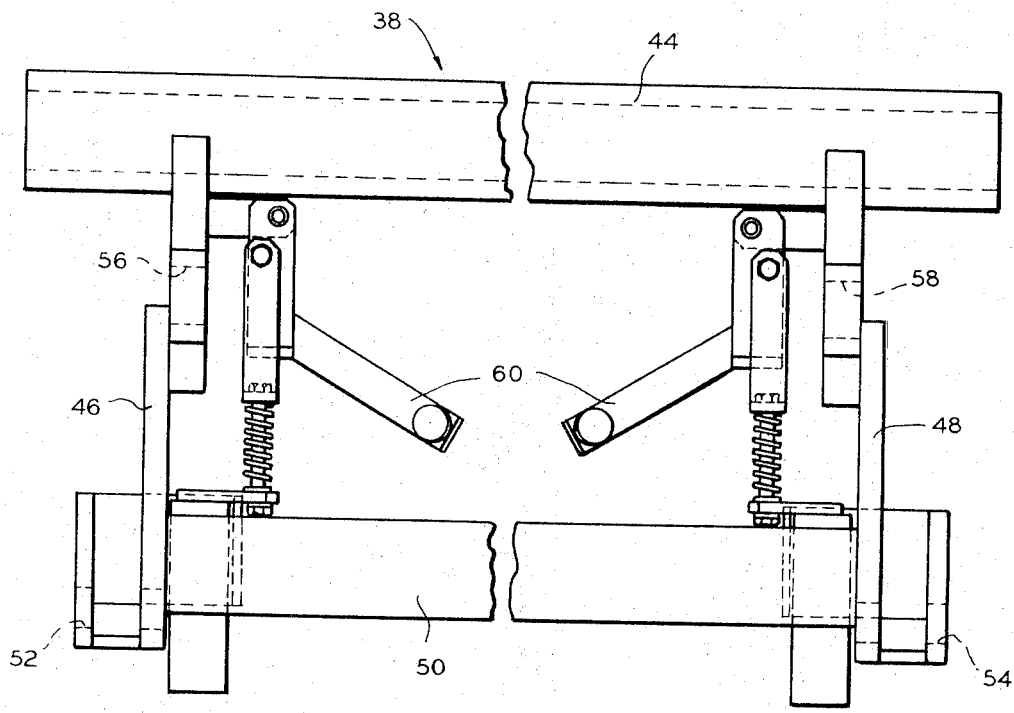
FIG. 3 is a rear view of the attachment carrier.

Referring now to FIGS. 1 and 2 of the drawing, the reference numeral 10 denotes generally a vehicle on which a backhoe 12 is mounted. Vehicle 10 includes a body 14 which is supported by a pair of drive wheels 16 on one side thereof and a pair of drive wheels 18 on the other side thereof. (The relative speeds of the wheels on opposite sides of the vehicle can be controlled so as to provide for differential steering of the vehicle.)

Connected to body 14 adjacent the rear thereof and extending upwardly therefrom is a pair of stanchions 20 and 22 to which a pair of forwardly extending boom arms 24 and 26 are connected for pivotal movement. Boom arms 24 and 26 are raised and lowered by means of a pair of double-acting piston and cylinder type fluid motors 28 which are connected between boom arms and stanchions, as shown.

Also located on body 14 between boom arms 24 and 26 is an operator's station 32 which includes a seat 34 and an overhead guard 36.

Figure 4:
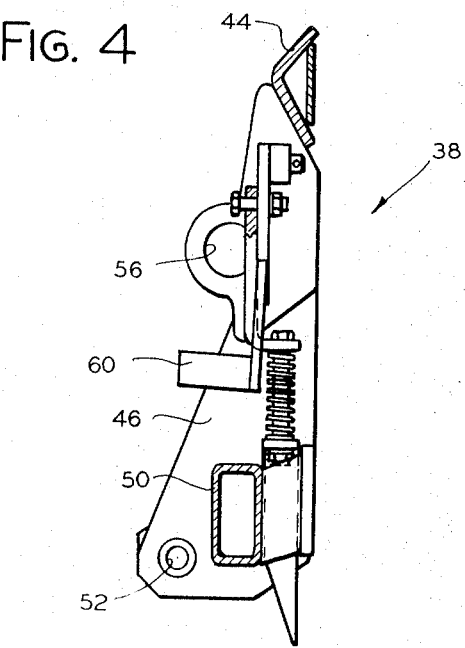
FIG. 4 is a side elevation of the attachment carrier.

Referring now also to FIGS. 3 and 4, it will be seen that an attachment carrier 38 is connected to the forward ends of boom arms 24 and 26 for pivotal movement relative thereto. Pivotal movement of carrier 38 is accomplished by a pair of double-acting piston and cylinder type fluid motors 40 which are connected between carrier 38 and boom arms 24 and 26, as shown.

Attachment carrier 38 includes a generally horizontally extending bar 44 which is adapted to engage an acute edge on an attachment so that the attachment can be picked up by carrier 38. Bar 44 is supported on a pair of generally upwardly extending members 46 and 48 which are connected by a cross brace 50 and pivotally connected to boom arms 24 and 26 at 52 and 54, respectively. Fluid motors 40 are connected to carrier 38 at 56 and 58, respectively. Carrier 38 also is provided with a pair of latches 60 which serve to lock certain attachments, such as a bucket, to carrier 38. A more detailed description of carrier 38 may be found in U.S. Pat. Application, Ser. No. 772,695, filed Nov. 1, 1968 now abandoned, and the continuation in part thereof, filed Nov. 5, 1969 now U.S. Pat. No. 3,672,521 issued June 27, 1972, which are assigned to the same assignee as the present invention.

Referring now also to FIGS. 5 through 9, it will be seen that a pair of fixed pins 62 extend outwardly from body 12 adjacent the lower front end thereof and a pair of retractable pins 66 are extendable outwardly from body 14 adjacent the upper front end thereof. Each retractable pin 66 is disposed in a sleeve 80 located in a sidewall 82 of body 14 so that pin 66 can be retracted into sidewall 82 or extended out through sidewall 82. These pins serve to connect an attachment to vehicle 10 as will be explained in more detail shortly.

Backhoe 12 includes a base 70 from which a pair of laterally spaced-apart plates 72 extend rearwardly. Each plate includes a generally upwardly extending slot 74 in the lower end thereof which cooperates with one of pins 62 and an opening 76 which cooperates with one of pins 66 so that backhoe 12 may be mounted on vehicle 10.

Extending inwardly from each plate 72 is a pair of plates 84 and 86 which form a generally inverted "V" and serve to receive bar 44 of carrier 38 when inserted between plates 84 and 86 and moved upwardly toward the apex of plates 84 and 86.

Figure 6:
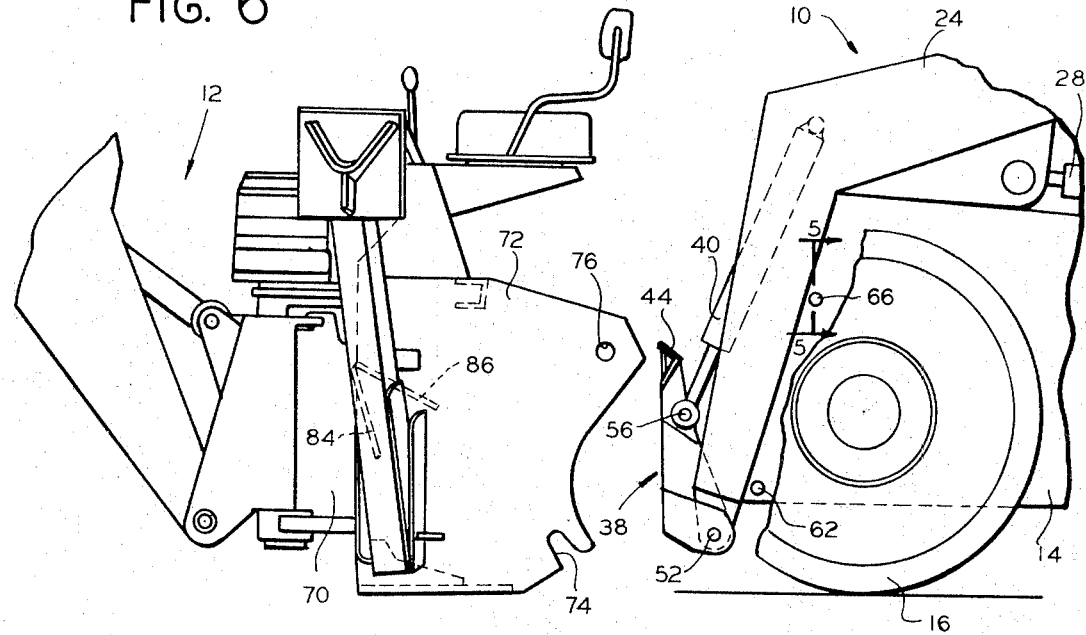
Figure 7:
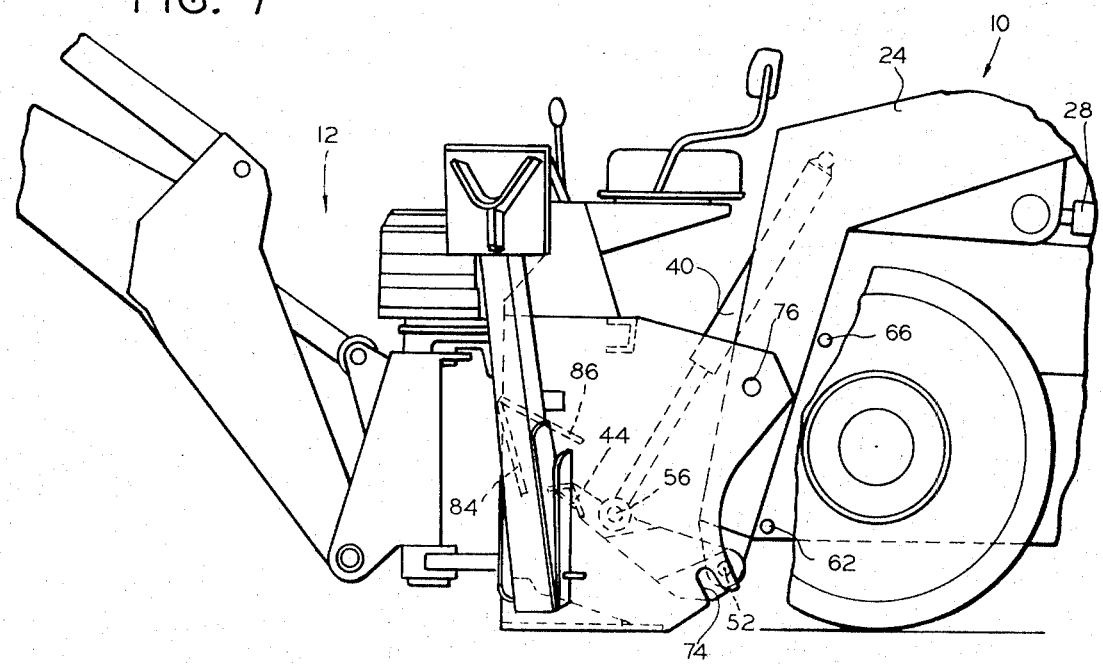

In order to enable persons skilled in the art to better understand my invention, I will now explain the operation of it. It will be assumed that it is desired to mount backhoe 12 on vehicle 10, and further that backhoe 12 is positioned on the ground in front of vehicle 10 substantially as shown in FIG. 6. The operator actuates fluid motors 40 to pivot carrier 38 forwardly to the position shown in FIG. 7. Then the operator actuates fluid motors 28 to raise boom arms 24 and 26 so that bar 44 of carrier 38 is inserted between plates 84 and 86 and cross brace 50 is brought into contact with base 70 of backhoe 12, whereby backhoe 12 is connected to carrier 38. Fluid motors 28 and 40 are then actuated to bring backhoe 12 to the position shown in FIG. 8 so that slots 74 are above and slightly forward of pins 62. Fluid motors 28 and 40 are now actuated so that slots 74 are lowered onto pins 62 and openings 76 are aligned with retracted pins 66, as shown in FIG. 9. Pins 66 are then extended outwardly into openings 76, thereby completing the connection of backhoe 12 to vehicle 10. If desired, boom arms 24 and 26 may be lowered slightly so that no shocks are transmitted through backhoe 12 to them.

In order to remove backhoe 12 from vehicle 10, the reverse of the procedure for mounting it on vehicle 10 is followed.

While my invention has been described in conjunction with a backhoe 12, it will be understood that any one of a number of other attachments could be used equally well so long as suitable means were provided on the attachment to cooperate with carrier 38 for picking up the attachment with boom arms 24 and 26 and cooperate with the pins 62 and 66 for mounting the attachment on vehicle 10.

While only a single embodiment of my invention and a single method of utilizing it have been described in detail, it will be clear that such description is intended to be illustrative only and that various modifications and changes can be made to my invention without departing from the spirit and scope of it. Therefore, the limits of my invention should be determined from the following appended claims.

I claim:

1. The method of mounting a backhoe having connecting means and carrier receiving means on a front end loader having elevatable boom arm means, a bucket and attachment carrier connected to the boom arm means for pivotal movement, a body and connecting means on the body, comprising the steps of connecting the backhoe to the boom arm means by engaging the carrier receiving means with the carrier and actuating the boom arm means and carrier to bring the connecting means of the backhoe into cooperation with the connecting means on the body so that the backhoe is connected to the front of the body of the front end loader and extends outwardly therefrom.

2. The method of mounting a backhoe having connecting means, locking means and carrier receiving means on a front end loader having elevatable boom arm means, a bucket and attachment carrier connected to the boom arm means for pivotal movement, a body connecting means on the body and locking means on the body, comprising the steps of connecting the backhoe to the boom arm means by engaging the carrier receiving means with the carrier, actuating the boom arm means and carrier to bring the connecting means of the backhoe into cooperation with the connecting means on the body and bringing the locking means on the backhoe into cooperation with the locking means on the body, and actuating one of the locking means so that the backhoe is fixedly mounted on the front of the body of the front end loader and extends forwardly therefrom.

3. The method of mounting a backhoe having carrier receiving means and connecting means including a pair of laterally spaced-apart plates, each plate having a generally downwardly extending slot and an opening, on a front end loader having elevatable boom arm means, a pivotal carrier connected to the boom arm means, a body and connecting means on the body including a pair of projections and a pair of retractable pins, comprising the steps of connecting the backhoe to the boom arm means by engaging the carrier receiving means with the carrier, actuating the boom arm means and carrier to bring the slots into engagement with the projections and align the openings with the pins, and extending the pins through the openings so that the backhoe is connected to the front of the body and extends forwardly therefrom.

4. The method by which an end loader vehicle having a material handling bucket mounted at one end thereof is rapidly convertible to other uses by removing the bucket and mounting in its place an end attachment, said end loader including a vehicle body, a pair of stanchions projecting upwardly adjacent the rear of said vehicle body and a pair of boom arms pivoted to said stanchions adjacent the upper end thereof and extending forwardly alongside an operator's compartment and then downwardly adjacent the front, an attachment carrier pivotally mounted on said boom arms adjacent the lower ends thereof, connecting means on the vehicle body adjacent the boom arms in the lowermost position and carrier receiving means on said end attachment having an upwardly converging opening for engaging with said attachment carrier, said method comprising the steps of connecting the end attachment to the boom arms by engaging the carrier receiving means with the attachment carrier, actuating the attachment carrier and boom arms in conjunction so as to manipulate the end attachment to a position adjacent said connecting means on the vehicle body and actuating said connecting means to secure the end attachment to the vehicle body.

* * * * *